(12) United States Patent
Seo et al.

(10) Patent No.: US 8,568,665 B2
(45) Date of Patent: Oct. 29, 2013

(54) CATALYST STRUCTURE AND HYDROGENATION/DEHYDROGENATION REACTION MODULE USING THE SAME CATALYST STRUCTURE

(75) Inventors: Takayuki Seo, Osaka (JP); Tsuneo Akiura, Osaka (JP); Masaru Ichikawa, Tokyo (JP)

(73) Assignees: Nippon Seisen Co., Ltd., Osaka (JP); Masaru Ichikawa, Tokyo (JP)

( * ) Notice: Subject to any disclaimer, the term of this patent is extended or adjusted under 35 U.S.C. 154(b) by 119 days.

(21) Appl. No.: 13/123,913

(22) PCT Filed: Dec. 28, 2010

(86) PCT No.: PCT/JP2010/073803
§ 371 (c)(1),
(2), (4) Date: Apr. 13, 2011

(87) PCT Pub. No.: WO2012/090326
PCT Pub. Date: Jul. 5, 2012

(65) Prior Publication Data
US 2012/0164034 A1    Jun. 28, 2012

(51) Int. Cl.
*B01J 8/02* (2006.01)
*B01J 35/02* (2006.01)
*B01J 19/00* (2006.01)
*B01J 8/00* (2006.01)
*B01J 23/00* (2006.01)
*B01J 23/02* (2006.01)

(52) U.S. Cl.
USPC ........... 422/211; 422/129; 422/187; 502/300; 502/337; 502/439

(58) Field of Classification Search
USPC .......... 422/129, 211, 187; 502/217, 300, 337, 502/439
See application file for complete search history.

(56) References Cited

U.S. PATENT DOCUMENTS

| 1,494,989 | A | * | 5/1924 | Bregeat ............................ 261/95 |
| 2,526,657 | A | * | 10/1950 | Guyer ............................ 422/653 |
| 4,330,436 | A | | 5/1982 | Cairns et al. |
| 4,355,577 | A | * | 10/1982 | Ady et al. ..................... 102/378 |
| 4,397,772 | A | | 8/1983 | Noakes et al. |
| 4,400,309 | A | * | 8/1983 | McMahon et al. ............ 502/337 |
| 5,833,931 | A | * | 11/1998 | Fromson et al. .............. 422/177 |

(Continued)

FOREIGN PATENT DOCUMENTS

| GB | 1 444 978 | 8/1976 |
| JP | 54-8357 B2 | 4/1979 |
| JP | 63-57092 B2 | 11/1988 |
| JP | 2-144154 A | 6/1990 |
| JP | 5-270801 A | 10/1993 |

(Continued)

OTHER PUBLICATIONS

International Search Report, PCT/JP2010/073803, Apr. 5, 2011.

*Primary Examiner* — Walter D Griffin
*Assistant Examiner* — Natasha Young
(74) *Attorney, Agent, or Firm* — Birch, Stewart, Kolasch & Birch, LLP

(57) ABSTRACT

A catalyst structure 1 used for hydrogenation reaction or dehydrogenation reaction is characterized by the inclusion of a first coiled catalytic wire body 4 formed by coiling a catalytic wire in which a catalytic material is supported on the surface of a metallic core material, and a second catalytic member 5 disposed on the inner surface side and/or outer surface side of the coiled catalytic wire body 4.

17 Claims, 6 Drawing Sheets

(56) References Cited

U.S. PATENT DOCUMENTS

| | | | |
|---|---|---|---|
| 6,258,461 B1 * | 7/2001 | Baldi et al. | 428/469 |
| 2007/0237692 A1 * | 10/2007 | Burd | 422/196 |
| 2009/0025291 A1 | 1/2009 | Ichikawa et al. | |
| 2009/0273780 A1 * | 11/2009 | Tomaru et al. | 356/301 |
| 2009/0277386 A1 * | 11/2009 | Takagi et al. | 118/724 |
| 2010/0018397 A1 | 1/2010 | Ishibe et al. | |

FOREIGN PATENT DOCUMENTS

| | | |
|---|---|---|
| JP | 7-192746 A | 7/1995 |
| JP | 8-49604 A | 2/1996 |
| JP | 2003-73102 A | 3/2003 |
| JP | 2004-250255 A | 9/2004 |
| JP | 2005-47743 A | 2/2005 |
| JP | 2007-117992 A | 5/2007 |
| JP | 2007-238341 A | 9/2007 |

\* cited by examiner (×160)

(×500)

CATALYST STRUCTURE AND HYDROGENATION/DEHYDROGENATION REACTION MODULE USING THE SAME CATALYST STRUCTURE

TECHNICAL FIELD

The present invention relates to a catalyst structure for hydrogenation reaction/dehydrogenation reaction which shows catalytic activity in a addition reaction of hydrogen to an aromatic compound or a dehydrogenation reaction of an hydrogenated aromatic compound for example, more particularly to a catalyst structure of which catalyst efficiency per unit volume is enhanced, and a module for hydrogenation/dehydrogenation reaction using the same catalyst structure.

BACKGROUND ART

In recent years, global warming is seen as a problem, and a fuel cell system attracts attention as a new clean energy as an alternative to fossil fuels which have been widely used. The fuel cell system uses hydrogen as fuel, and only water is discharged during generating electric power. Thus, it is expected to spread widely as an energy technology which is most environmentally friendly and clean.

On the other hand, in the gasoline automobiles, diesel generators for ships/locomotives, etc., "hydrogen-oil co-combustion technique" adding hydrogen to the fuel oil such as gasoline has been proposed. This technique is expected to improve the fuel consumption and reduce the generation of substances becoming environment loads, e.g. $CO_2$, $NO_x$, CO and the like. In such technological innovation, therefore, there is a growing demand for hydrogen.

Meanwhile, hydrogen has problems with storage and transportation which are difficult because hydrogen is combustible and is a substance causative of hydrogen embrittlement of metallic materials. Accordingly, as for the production, storage and transportation of hydrogen, all sorts of provisions are required.

In view of the above-mentioned problems, studies have been made on a hydrogen storage-supply system capable of supplying hydrogen quickly responding to the demand.
For example, as such system, A) a method for obtaining hydrogen from raw materials including hydrogen e.g. natural gas, propane gas, methanol and the like through a technique such as steam reforming and hydrogen separation, B) a method utilizing a catalytic body formed in the form of a plate, ribbon or honeycomb and provided with a catalyst supported by γ-alumina layer on the surface thereof, and C) a method utilizing photosynthesis bacteria, anerobic hydrogen bacteria and the like
have been proposed. (see, for example, patent documents 1 and 2)

As for storage means for the obtained hydrogen, for example, a storage system utilizing a hydrogen storage alloy, and a system development utilizing carbon materials e.g. carbon nanotube, carbon nanofiber and the like have been proposed. (see, for example, patent documents 3 and 4)
[Patent documents1]
Japanese patent application publication 2007-117992
[Patent documents2]
Japanese patent application publication H02-144154
[Patent documents3]
Japanese patent application publication H07-192746
[Patent documents4]
Japanese patent application publication H05-270801

DISCLOSURE OF INVENTION

Problems to be Solved by Invention

In the former hydrogen production system, however, in order to effectively obtain a certain amount hydrogen, the equipment is necessitated to grow in size or get complex as a result of, for example, the use of a large-sized module or the simultaneous use of multiple modules. For this reason, problems of the installation space and high cost of the equipment have been pointed out, and hinder the spread.

The latter storage system utilizing a hydrogen storage alloy has problems with the limitation of the amount of hydrogen storage per unit volume of the used alloy, and also with the response speed. Further, the hydrogen storage alloys are costly, therefore, the spread has not yet been sufficient.

Under such conditions, the present inventors made repeated experiments variously, and arrived at a conclusion such that, in a hydrogen storage-supply system which is low in cost and excel in production efficiency and hydrogen response,
it is effective to include
a coiled catalytic wire body in which a catalytic wire on which a specified catalytic material having functional capability of hydrogenation reaction or dehydrogenation reaction is supported, is coiled in a specified form, and
a second catalytic member disposed on the inner surface side and/or outer surface side of the coiled catalytic wire body, and accomplished the present invention.

As stated above, the present invention has the objective of providing a catalyst structure further improved in its catalytic function as a supported catalyst for hydrogen which is enhanced in the rate of reaction of absorbing and desorbing hydrogen and excel in hydrogen response, and also providing a module for hydrogenation/dehydrogenation reaction using the same catalytic structure.

Means for Solving the Problems

First invention in the present invention is a catalyst structure for hydrogenation reaction or dehydrogenation reaction, characterized in that it comprises
a first coiled catalytic wire body formed by coiling a catalytic wire in which a catalytic material is supported on the surface of a metallic core material, and
a second catalytic member disposed on the inner surface side and/or outer surface side of the coiled catalytic wire body.

Second invention in the present invention is a module for hydrogenation reaction comprising the catalyst structure, and a housing case containing the catalyst structure, and characterized in that the above-mentioned housing case is provided therein with an interior channel which connects one opening and other opening and through which a fluid to be processed flows, and the above-mentioned catalyst structure is incorporated such that the axis line of the above-mentioned first coiled catalytic wire body is oriented in the flow direction of the above-mentioned fluid to be processed.

According to the first invention, as the catalytic wire is coiled into the coiled catalytic wire body, the surface area can be increased.

In addition, as the second catalytic member is disposed in a spacial region on either inner surface side or outer surface side of the first coiled catalytic wire body occupying a specific volume, the density of the supported catalytic material per specified constant volume is further increased, and the performance is improved.

Thereby, the catalyst structure of the present invention is increased in the scope of use, and can contribute to improvement in the hydrogen-storage-and-supply efficiency and hydrogen response in a fuel-cell-system and internal-combustion engine for example.

According to the second invention which is the module for hydrogenation reaction using the above-mentioned catalyst structure, the catalytic material supported and fixed on the increased surface area, can be constructed as an equipment component which can be utilized more effectively and handed easily. Such module for hydrogenation/dehydrogenation reaction is increased in the application range.

Figure 1:
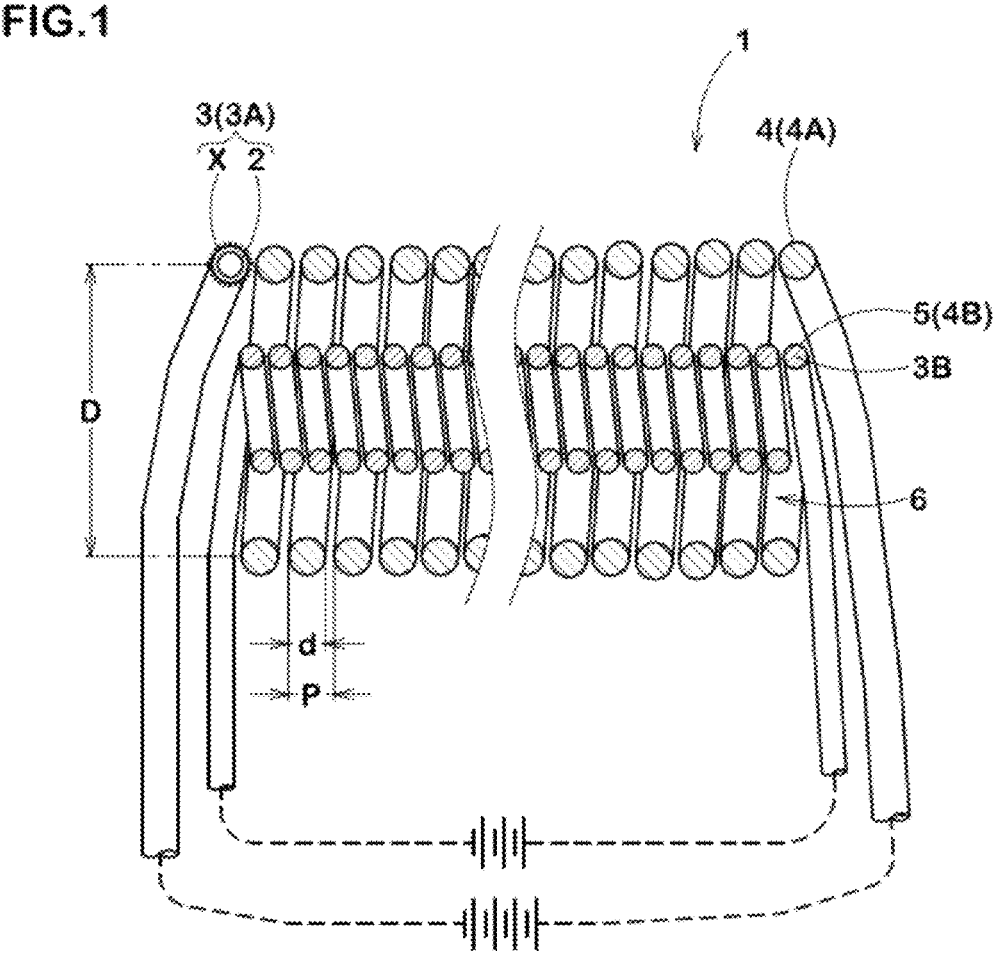
FIG. 1 A cross-sectional view showing an example of the catalyst structure according to the present invention.

DESCRIPTION OF REFERENCE SIGNS 1 catalyst structure
2 core material
3 catalytic wire
4 first coiled catalyst
5 second catalytic member
X catalytic material

BEST MODE FOR CARRYING OUT INVENTION

Hereinafter, embodiments of the present invention will be described with referent to the drawings.

As exemplified in FIGS. 1 and 2, the catalyst structure 1 of the present invention is constructed so as to include
a first coiled catalytic wire body 4 (hereinafter, simply called the "first coil" in some cases) formed by coiling a catalytic wire 3 in the form of a coil with specified coil diameter, wherein the catalytic wire 3 is such that a catalytic material X for example platinum, a transition metal or the like for hydrogenation reaction for an aromatic compound or dehydrogenation reaction for a hydrogenated derivative of the aromatic compound, is supported on the surface of a metallic core material 2, and
a second catalytic member 5 disposed in a spacial region on the inner surface side and/or outer surface side of the first coiled catalytic wire body 4.

Figure 2:
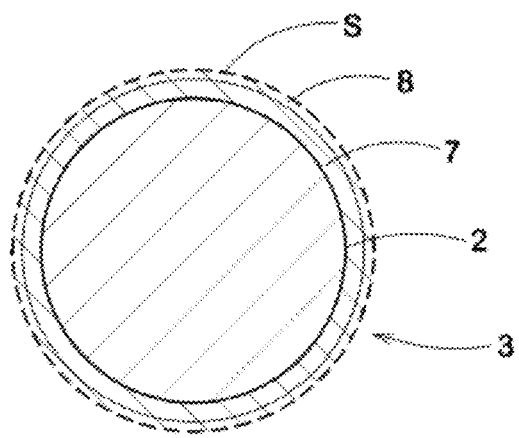
FIG. 2 An enlarged cross-sectional view of a catalytic wire.

The second catalytic member 5 shown in FIGS. 1 and 2 is composed of a second coiled catalytic wire body 4B (hereinafter, simply called the "second coil" in some cases) formed by coiling a catalytic wire same as the foregoing in the form of a wire coil having a diameter smaller than the above-mentioned first coiled catalytic wire body 4.

And this second catalytic member 5 is concentrically disposed in the internal space 6 of the first coiled catalytic wire body 4. The outer first coil 4A and the inner second coil 4B are constructed by combining in a condition of contact or non-contact.

In this embodiment, the two coiled catalyst wire bodies have similar constructions. Therefore, in the following description, when descriptions are to be made, pinpointing the core material and catalytic wire of the above-mentioned first coil, a suffix "A" is added to each of the reference signs 2-3. Likewise, when descriptions are to be made, pinpointing the second coil, a suffix "B" is added to each of the reference signs 2-3.

When descriptions about items common to both of the coiled wire bodies are to be made, the suffix "A" and "B" might be omitted.

In FIG. 1, each of the first coil 4A and second coil 4B is a coil-shaped product formed from a catalytic wire 3 in which a catalytic material X is supported on the surface of the selected core wire 2, and which is coiled at predetermined coil diameter (D) and pitch (P).

The dimensions and cross-sectional shape of each catalytic wire 3 should not be specifically restricted. But, in the case of the catalytic wire 3A of the outer first coil 4A, for example, suitably used is the long product having a relatively small diameter adjusted to a wire diameter of not more than 0.8 mm, more preferably 0.2 to 0.6 mm. It is also possible to construct it with that exceeding this.

Likewise, as to the catalytic wire 3B of the second coil 4B, that having the same diameter or a smaller diameter than the catalytic wire 3A of the first coil 4A is used.

In this embodiment, since the second coil 4B is inserted in the first coil 4A, the wire diameter is determined in order to make the coil diameter thereof to be smaller.

Therefore, the wire diameter of the catalytic wire 3B is set arbitrarily according to the coil diameter of the coil.

Further, in the case that the catalytic wire 3 is of a small diameter, by reducing the coil diameter of the coil-shaped product, it becomes possible to build in more coil-shaped products within the predetermined case. Thereby, it becomes possible to closely arrange the coil-shaped products, which is desirable in that the amount of the catalytic material X supported per unit volume is increased.

As to the cross-sectional shape of the catalytic wire 3, that having a circular section as in the usual wire materials can be easily adopted. Aside from this, for example, arbitrary non-circular shapes such as ellipse shape, triangular shape, band-like, rectangular shape and star shape and the like may be adopted.

Especially, in the case of the cross-sectional shape which is the circle shape or ellipse shape or a polygonal shape such as the star shape, the surface area is notably increased, and the reception capacity for the catalytic material X can be increased like in the wire diameter.

As explained above, since the catalytic wire 3 of the present invention encompasses those having noncircular cross sectional shapes, the wire diameter thereof is defined by a converted equivalent wire diameter calculated from the area of the cross section.

As for the metallic material for used in the core wire 2 of each of the above-mentioned catalytic wires 3A and 3B, in view of electrical characteristics, it is desirable to select either one of metallic materials for example, stainless steels, nickel or nickel alloys, chromium or chromium alloys, titanium or titanium alloys, aluminum or aluminum alloys, tungsten or tungsten alloys and the like.

In this instance, it is possible that the first coil 4A and second coil 4B are made of an identical metallic material or made of different kinds of metallic materials.

But, it is preferable that the core wire 2 of at least one of them is made of the above-mentioned metallic material.

Further, as to the chemical composition of the alloy suitable for the above-mentioned core wire 3, JIS NCH1 or NCH2 comprising Cr:15 to 25 wt %, Ni$^+$ Co: not less than 55%, C: not more than 0.15%, Si:0.5 to 1.5%, Mn: not more than 2.5%, the balance being Fe and very slight incidental impurities, or JIS FCH1 or FCH2 comprising Cr:15 to 25 wt %, C: not more than 0.10%, si: not more than 1.5%, Mn: not more than 1.0%, A1:2 to 6%, the balance being Fe and incidental impurities is quoted as an example.

As to the above-mentioned nickel material, for example, N200 material comprising Ni: not less than 99 wt % is preferred since the heat generation characteristic resembles that of aluminum especially, and it is excel in the processability into a small diameter.

It is preferable that the above-mentioned metallic material has such a characteristic that its electrical resistivity is not less than 5 μΩ·cm, for example 5 to 200 μΩ·cm. The catalytic wire 3 made of such metallic material and the coiled wire bodies 4 can be easily heated up to the predetermined intended operating temperatures (for example 200 to 600 degrees c) by means of electromagnetic induction heating or heating by directly electrifying it at the point of use. For this reason, there is no limitation in the use environment, use situation and the like, and the application range can be expected to expand.

As a further preferred embodiment of such catalytic wire 3, for example, a coated wire in which the surface of the core wire 2 made of the above-mentioned metallic material is coated in advance with a metal layer 7 of aluminum (simply referred as the "aluminum layer" in some cases), is used.

For example as shown in FIG. 2 to FIG. 6, through an alumite treatment made after the process of reducing the diameter to the specific wire diameter, the coated wire can be provided with an alumite layer 8 having a microscopical porous structure as a surface layer of the aluminum layer.

The alumite layer 8 can be formed by for example anodizing the above-mentioned aluminum layer 7.

The aluminum layer 7 can be formed through for example a coating process based on plating techniques or clad techniques as well as a precipitation heat treatment (not illustrated) by making the core wire 2 from a metallic material including aluminum and precipitating the aluminum element as a precipitate layer on the surface.

As to the composition rate of coating of the aluminum layer (including the alumite layer 8) in the above-mentioned catalytic wire 3, it is preferable that the rate defined by [the volume of (alumite layer+aluminum layer)/the entire volume of the catalytic wire] is from 2 to 40% inclusive of their variations for example.

If this volume rate is less than 2%, it is difficult to obtain a sufficient thickness for the alumite layer.

If more than 40%, the production efficiency decreases, and there is a possibility that defects are caused by the effect of heat in use and the strength is decreased.

More preferably, the composition rate of coating is set in a range of from 5 to 30%, still more preferably 8 to 25%. The thickness of the aluminum layer 7 is preferably not more than 0.2 mm, more preferably about 10 to 100 micrometers for example.

The above-mentioned alumite layer 8 is, as explained above, formed by anodizing the aluminum layer 7 and a calcination treatment.

For example as disclosed in Japanese Patent Application Publication H02-144154, H08-246190 or the like, this process is carried out through an electrochemical treatment in an electrolysis solution and the calcination treatment to heat up to about 350 to 600 degrees C. for example.

Although details of the generation phenomenon are omitted here, it is assumed that, due to the growth of fine particles formed by agglutination of aluminum oxide colloid, the surface part partially becomes fine pores devoid of the fine particles, thereby, the above-mentioned porous structure is made.

Figure 5:
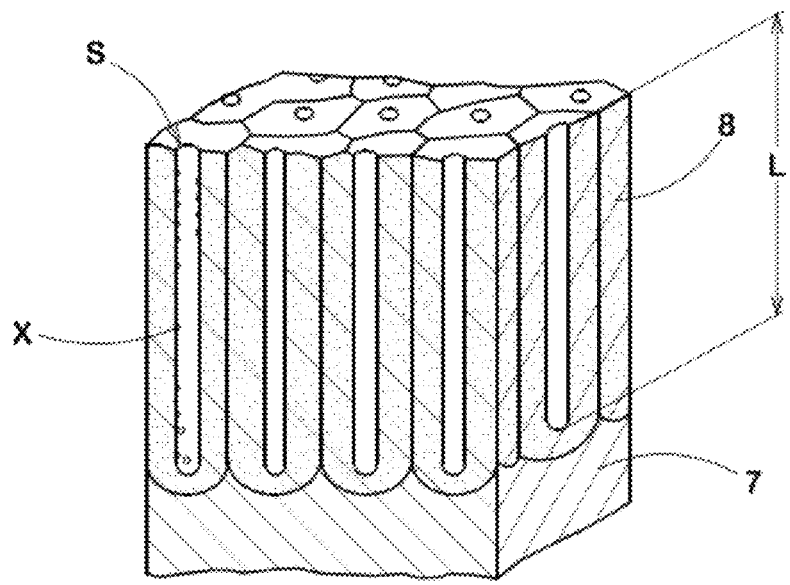
FIG. 5 An enlarged view showing a porous structure of the alumite layer supporting the catalyst.
Figure 6:
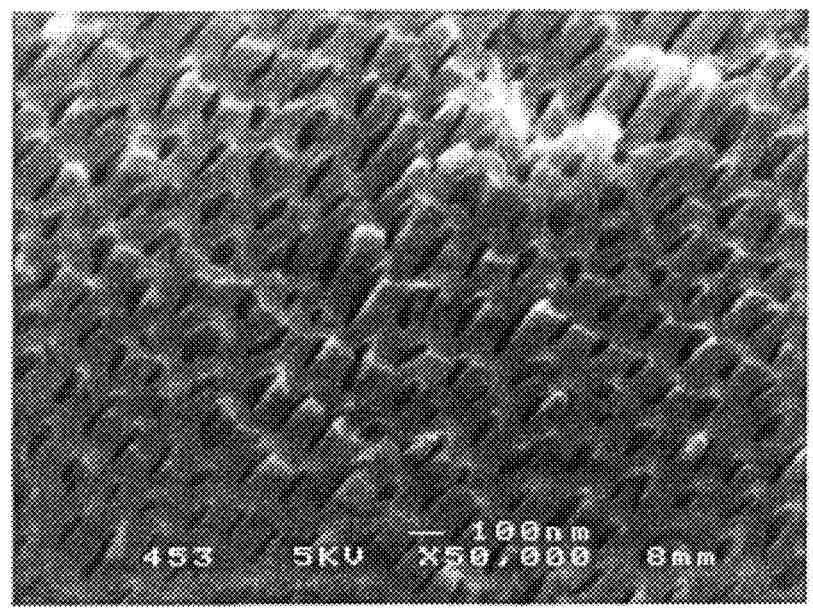
FIG. 6 A microscope photograph showing an example of the porous surface in the embodiment.

An example of the porous structure which can be obtained is shown in FIG. 5 and FIG. 6. This porous structure is, as shown, a mesoporous structure in which bottomed microscopical fine pores S formed in the thickness direction thereof are distributed in a hexagonal pattern.

The fine pore S is tubular, having a bottom, a microscopical opening whose inside diameter is for example about 10 to 100 nanometers, preferably 30 to 50 nanometers, and a length (L) of not more than 500 micrometers.

If necessary, it is desirable to adjust the aspect ratio (the length L/the inside diameter d) of the opening to about 3 to 2000 by making an aftertreatment to increase the width and/or depth of the fine pores S.

The above-mentioned alumite layer 8 functions as an electrically nonconductive insulating sheath. Thus, the catalytic wire 3 covered with the insulating sheath can be used without taking particular isolating measures for preventing electrical short due to contact with other members (other coiled wire bodies, the housing case and the like) in use.

As the porous structure of the alumite layer 8 is very fine and hard, the catalytic material X is supported on the inner surfaces of the fine pores S as shown in FIG. 5. Accordingly, even if contacting or rubbing with other members in use, the catalytic material X is not separated. And deformation and closing of the fine pores can be prevented.

Figure 3:
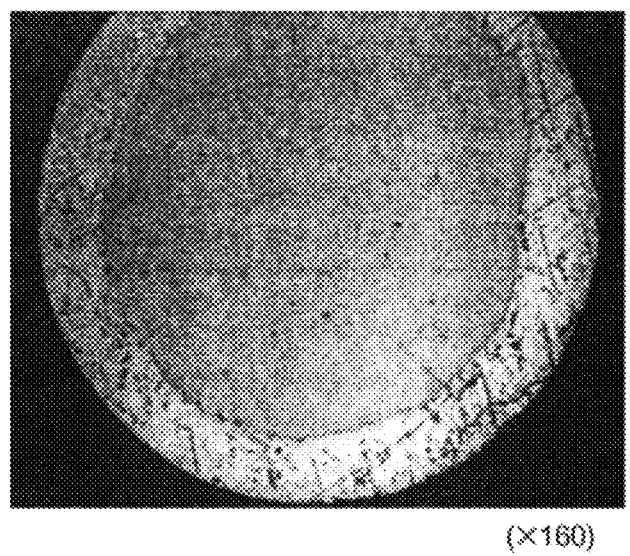
FIG. 3 A microscope photograph (×160) showing the cross section of the catalytic wire.
Figure 4:
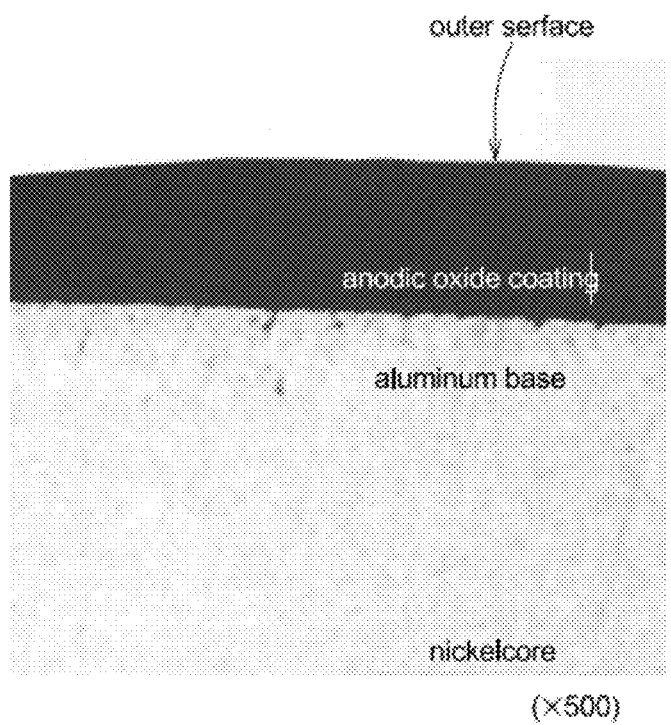
FIG. 4 A microscope photograph (×500) of a cross section of a catalytic wire having an alumite layer.

The above-mentioned FIG. 3 and FIG. 4 are examples of closeup pictures showing a cross section of the catalytic wire 3 in a compound state.

FIG. 3 shows the clad state of the aluminum surface layer.
FIG. 4 shows the anodic oxide coating of the aluminum layer (alumite layer).

The catalytic material X can be selected from various ones according to the intended end-usage.

By a simultaneous step or successive steps, from a water or ethanol or methanol solution in which, for example, platinum, rhodium, rhenium, nickel, zirconium, titanium, zinc, magnesium, molybdenum or tungsten is used as a salt or their hydrochloride, nitrate, oxalate and oxoate, to the thin wire of the alumite clad metal provided with the porous surface layer of alumina, the catalytic material X can be impregnated to be supported. The present invention includes an invention in which the catalytic material X is supported on the core wire 2 directly without utilizing the above-mentioned alumite layer, and the same kind of or different kinds of catalytic materials X can be used in the first coil 4A and second coil 4B (the second catalytic member 5).

If a platinum solution including platinum as the catalytic material X is given for example, this is applied to the alumite layer 8 of the porous structure and pressure infiltrated into the above-mentioned bottomed fine pores S— such support method is recommended.

In this process, suitably used as the platinum solution is hydrogen hexachloroplatinate(Iv) hexahydrate liquid, diammine dinitro platinum(II) nitric acid solution, hexammine platinum(IV) chloride solution, tetraammineplatinum (II) hydroxide solution or the like for example.

In the case of the platinum and/or transition metal salt solution, the support can be made simultaneously or successively through a method of dipping, dripping, applying, spraying or the like under a specific temperature range, while heating the alumite clad thin metallic wire by the application of electrical current or electromagnetic induction.

In addition, the support can be made through a chemical vapor fixation technique (Chemical vapor Deposition) using $Pt(CO)_2Cl$, $Rh_4(CO)_{12}$, $Ni(CO)_4$, $Re_2(CO)_7$ or the like namely a metal carbonyl compound, $CpTiCl_2$ (Cp=Cyclopentadienyl), $Mo(CO)_6$ or the like.

After the support, it is desirable to make an activation treatment by gradually calcining it within a temperature range of from 250 to 600 degrees C. in the atmosphere including oxygen, and then gradually increasing the temperature within a temperature range of from 100 to 450 degrees C. in hydrogen gas atmosphere.

It is possible to adjust the aluminum clad metal fine wire catalyst which supports the platinum and/or transition metal by applying to the hydrogen activation treatment or a reduction treatment using a reducing agent such as hydrazine and boron hydride, or the like.

The amount of the supported platinum and transition metal on the alumite clad metal fine wire is for example, 0.01 to 10%, preferably 0.1 to 5% in the weight ratio.

In the atom ratio, the amount of the supported platinum and transition metal is 0.1 to 10, preferably 0.1 to 0.5.

It is not restricted to the described selection of the precursor substance of the catalyst, manufacturing process of the catalyst, and conditions of the activation treatment.

In the present invention, as shown in FIG. 1, the catalytic wire 3 supporting the catalytic material is used as the above-mentioned each coil-shaped product having a specified coil diameter, for example, an average coil diameter of about 3 to 30 mm.

As to the coil shape, it is desirable to be implemented in consideration of the wire diameter of the catalytic wire 3 and the above-mentioned alumite layer 8 in the surface.

Especially, the alumite layer 8 in this embodiment is hard and high brittle.

Strong processing such as coil-shaping causes large deformation on the wire surface. Therefore, the designing is required to be made in consideration for not causing cracks and separation on the alumite layer 8 by the coil-shaping and the expansion and contraction accompanying the heating during use.

For example, it is desirable that the alumite treatment is carried out after the coil-shaping, and/or that the ratio (D/d) of the average coil diameter (D) of each coiled wire body 4 and the equivalent diameter (d) of the catalytic wire 3 thereof is set in a range of not less than 3 times, preferably 2 to 20 times, more preferably 5 to 15 times, still more preferably 7 to 10 times.

The coil pitch (P) of the coiled wire body 4A, 4B is preferably set to be not more than 2 times, more preferably about 1.01 to 1.50 times the equivalent diameter (d) of the catalytic wire 3.

Thereby, the catalyst performance is improved, and the flow path for the supplied fluid material is secured.

Further, the other catalytic member (for example, second coiled wire body) and the like can be prevented from being entwined between the pitches. As a countermeasure for preventing such entwining, it is preferred to reverse the coiling directions of the coiled wire bodies.

In the above embodiment, there is disclosed the construction in which the first coil 4A is combined with the second coil 4B disposed on the inside thereof and having the same construction.

However, if necessary, it is possible to combine this catalyst structure 1 and other catalytic member(s) to have three, four or more kinds of them. By such combination, it becomes possible to provide more catalytic material within a given volume.

As a concrete example, the third or fourth catalytic member supporting catalyst can be provided on the inside and/or outside of the catalyst structure made up of the first coil 4A and second coil 4B in combination.

It is preferable that these catalytic members are each temporary fixed not to displace in respect of the spacing, coil pitches and the like.

As to the second catalytic member 5, instead of using the coil-shaped product formed by coiling the catalytic wire 3, it is possible to use, for example, rod-shaped, tube-shaped tubular body, rod-shaped body or tube-shaped product formed by twisting together a plurality of fine-wire-shaped catalytic wires or rolling a woven cloth of them.

Further, it is also possible to use an unwoven cloth structure made of the metallic material in a fibrous form.

Figure 7:
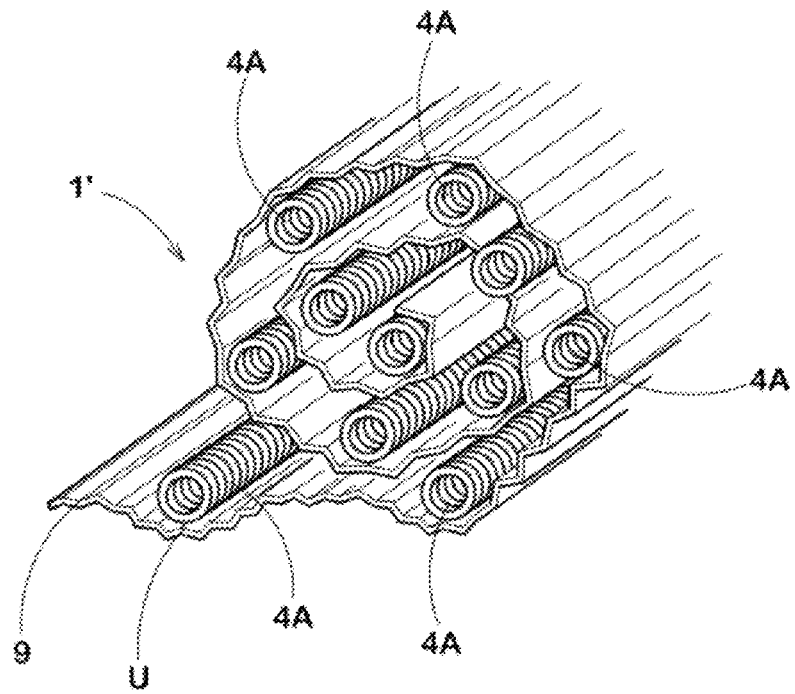
FIG. 7 A perspective view showing another embodiment of the catalyst structure.

For example, as shown in FIG. 7, the second catalytic member 5 may be formed as a woven cloth screen.

In this embodiment, the screen of the second catalytic member 5 is that formed in the form of an open mesh by weaving the catalytic wires on which the catalytic material X is supported in the same manner.

This woven cloth sheet 9 is previously processed for concavoconvex corrugation of a certain pitch.

The above-mentioned woven cloth sheet 9 has for example a mesh size of about 100 to 300 # and a corrugation pitch of about 6 to 20 mm.

A plurality of the first coils 4A having a specific length are arranged in the concave grooves u of the corrugated woven cloth sheet 9, and it is rolled spirally.

Thus, it is formed as a columnar complex having a space through which the fluid passes from one end to the other end in the longitudinal direction thereof.

The catalyst structure 1' formed as explained above is provided within its cross section with a flow path defined by the first coil 4A, and micro flow paths between the woven cloth sheet 9 as being the second catalytic member. And the above-mentioned catalytic material X is supported on the surface of each member, therefore, the contact with the fluid material is increased to effectively induce the hydrogenation reaction. Besides, such catalyst structure 1' is easy to shape and work upon, and rich in elasticity. Accordingly, it is easy to built the catalyst structure 1' in a limited space for example piping. In the catalyst structure 1', further, as the first coil 4A is steadily supported by the woven cloth sheet 9, its displacement is inhibited, and the stabilization of the temperature of the generated heat and an improvement in the processing power are expected.

In the catalyst structure 1', furthermore, it is possible to heat the fluid material in good response and with good efficiency by applying a specified electrical current to each of the woven cloth sheet 9 and the first coil 4A.

In this instance, for example, it is possible to apply the electrical current to only whichever is selected from the woven wires constituting the woven cloth sheet 9.

As another embodiment, the second catalytic member 5 may be formed as a tubular body having a small diameter and enveloping the first coiled wire body 4A.

On the inside surface of the tubular body, the catalytic material X is supported in the same way as explained above.

In this embodiment, for example, there can be used as the tubular body, a narrow tube in which an aluminum metal is used as its core metal.

With forming the alumite layer directly on the surface of the aluminum metal or without forming the alumite layer, the catalytic material X can be supported.

The tubular body envelopes the substantially entirety of the first coiled wire body 4A disposed on the inside thereof, and improves the thermal insulation. And it can be manufactured at low cost.

Figure 9:
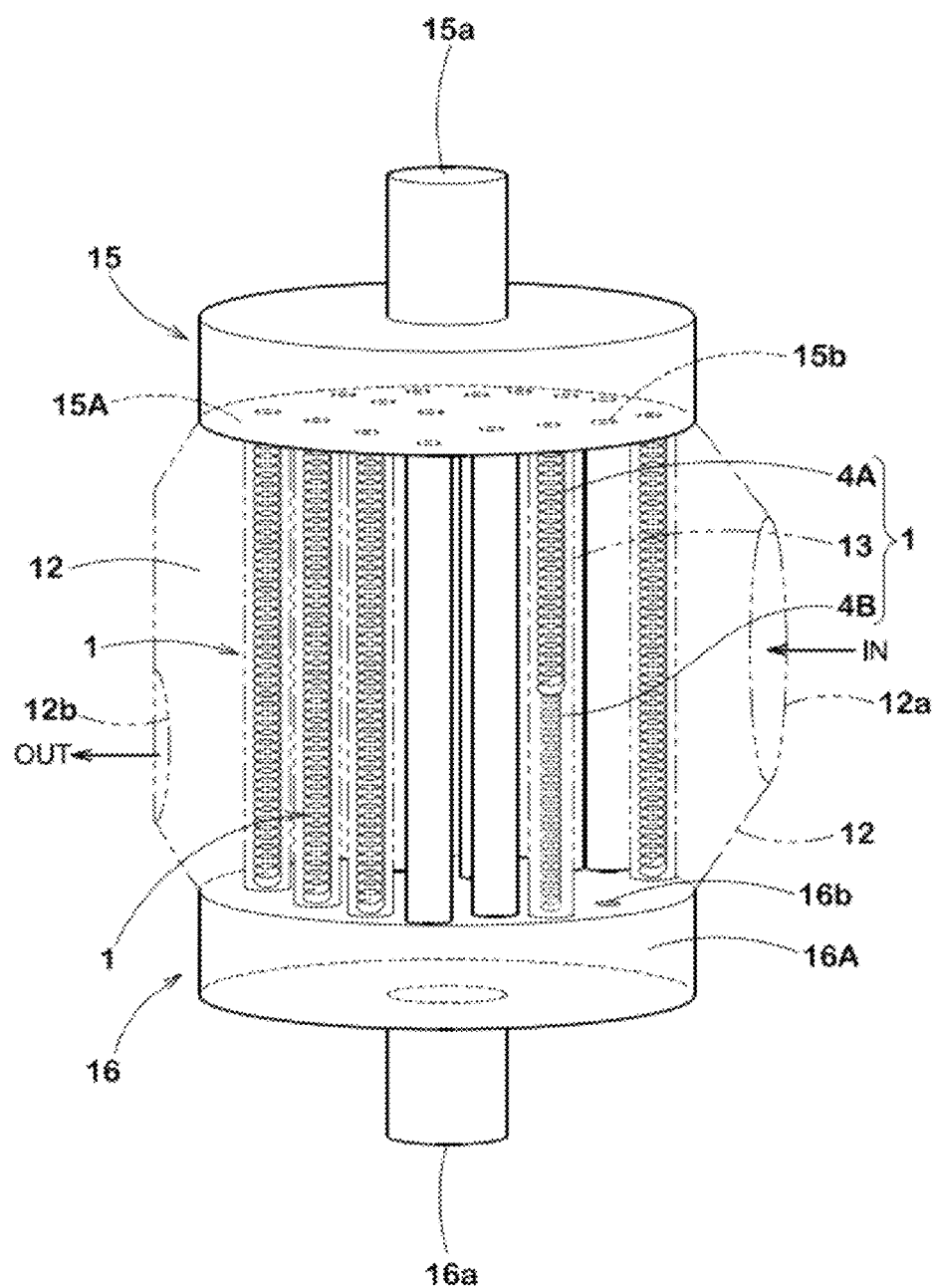
FIG. 9 A perspective view showing another embodiment of the module for hydrogenation reaction.

As the tubular body in this embodiment can be utilized as a pipe for supplying the fluid to be processed, the structure thereof is understood as enveloping each of or a plurality of the wire bodies of a plurality of catalyst structures 1 as shown in FIG. 9 (described later) for example.

In order to induce a hydrogenation reaction by the use of each catalyst structure 1 described above, for example, as shown in FIG. 10 diagrammatically, it is used in a hydrogen storage/hydrogen production system 20 as a supported alumite clad metal fine wire catalyst for hydrogenation/dehydrogenation reactions.

The above-mentioned hydrogen storage/hydrogen production system 20 is an apparatus which can store hydrogen as an organic hydride (for example, methylcyclohexane) which is a hydrogenated derivative obtained by adding hydrogen to an aromatic compound (for example, toluene), and can produce hydrogen by separating the aromatic compound and hydrogen by dehydrogenating the organic hydride.

This system 20 essentially comprises a reactor vessel 22, a first tank 23 containing the aromatic compound, a second tank 24 containing the organic hydride, and a third tank 25 for storing the reaction product produced in the reactor vessel 22.

For example, the above-mentioned reactor vessel 22 comprises a heating means 26 utilizing electromagnetic heating or electrothermal heating, and an alumite clad metal fine wire catalyst with supported platinum for hydrogenation/dehydrogenation reactions (hereinafter, simply referred to as "platinum support alumite clad fine wire catalyst") 27 heated by the heating means 26.

On the upper side of the reactor vessel 22, there is disposed one end of a first pipe 28 for supplying the fluid material so as to penetrate.

On the inside of the reactor vessel 22, the one end of the first pipe 28 is provided with a spray nozzle 29.

On the outside of the reactor vessel 22, the first pipe 28 is provided on the way with a valve 30.

The other end of the first pipe 28 opposite to the spray nozzle 29 is provided with a three-way valve 32.

The three-way valve 32 is connected to the first tank 23 with a pipe 31, and a fluid feeding pump 33 is connected to the pipe 31. The three-way valve 32 is connected to the second tank 24 with a pipe 34, and the fluid feeding pump 35 is connected to the pipe 34. The three-way valve 32 can select one of a) to open between the first tank 23 and the reactor vessel 22 only,
b) to open between the second tank 24 and the reactor vessel 22 only,
c) to close between the reactor vessel 22 and the first tank 23, the second tank 24.

Further, on the upper side of the reactor vessel 22, one end of the second pipe 36 for supplying hydrogen is disposed so as to penetrate. A valve 37 is connected to the second pipe 36. On the outside of the reactor vessel 22, a hydrogen supply means (not shown) is connected to the other end of the second pipe 36. A portion of the reactor vessel 22 near the bottom is connected to an upper portion of the third tank 25 with a third pipe 38. A pump 39 and a cooler 40 are connected to the third pipe 38. A pipe 41 for releasing gas such as hydrogen and the like is connected to the upper portion of the third tank 25.

In the case that hydrogen is stored in the form of an organic hydride, the operation is made according to the following procedures.

First, using the heating means 26, the platinum support alumite clad metal fine wire catalyst 27 is heated up.

Then, the valve 37 is opened, and the hydrogen is supplied to the inside of the reactor vessel 22 through the second pipe 36. At this time, it is preferable to activate the pump 39 and to flow out the hydrogen on the outside of the reactor vessel 22 through the pipe 41.

Next, the three-way valve 32 is selected so as to open only the route between the first tank 23 and the reactor vessel 22, and the fluid feeding pump 33 is activated. Thereby, the aromatic compound in the first tank 23 is supplied to the inside of the reactor vessel 22.

Then, the valve 30 is opened for example at constant time intervals. Thereby, the aromatic compound is sprayed from the spray nozzle 29 toward the inside of the reactor vessel 22 at constant time intervals.

In the inside of the reactor vessel 22, the sprayed aromatic compound and hydrogen cause a hydrogenation reaction on the surface of the platinum support alumite clad fine wire catalyst 27, and an organic hydride is produced.

The organic hydride is sent to the inside of the third tank 25 through the pump 39.

The product in the form of gas flowing through the third pipe 38 is cooled by the cooler 40, and stored in the inside of the third tank 25 in the form of liquid.

When cooled by the cooler 40, as the hydrogen does not become liquid, it is ejected to the outside through the pipe 41.

on the other hand, in the case that hydrogen is produced by a dehydrogenation reaction on the organic hydride, the operation is made according to the following procedures.

First, using the heating means 26, the platinum support alumite clad fine wire catalyst 27 is heated up.

Then, the pump 39 is activated, and the three-way valve 32 is selected so as to open only the route between the second tank 24 and reactor vessel 22.

Further, by activating the fluid feeding pump 35, the organic hydride in the inside of the second tank 24 is supplied to the inside of the reactor vessel 22.

Then, by opening the valve 30 at constant time intervals, the organic hydride is sprayed from the spray nozzle 29 towards the inside of the reactor vessel 22 at constant time intervals. The sprayed organic hydride contacts with the surface of the platinum support alumite clad metal fine wire catalyst 27, and the dehydrogenation reaction is caused.

Thereby, hydrogen and aromatic compound are produced. This aromatic compounds is sent to the inside of the third tank 25 through the pump 39.

The aromatic compound in the form of gas flowing through the third pipe 38 is cooled by the cooler 40 and stored in the inside of the third tank 25 in the form of liquid.

The hydrogen is ejected to the outside through the pipe 41.

In this embodiment, the platinum support alumite clad fine wire catalyst is used for both of the hydrogenation reaction of the aromatic hydrocarbon and the dehydrogenation reaction of the hydrogenated derivative.

However, it may be used for only the hydrogenation reaction of the aromatic hydrocarbon.

Further, it may be used for only the dehydrogenation reaction of the hydrogenated derivative (organic hydride).

Figure 8:
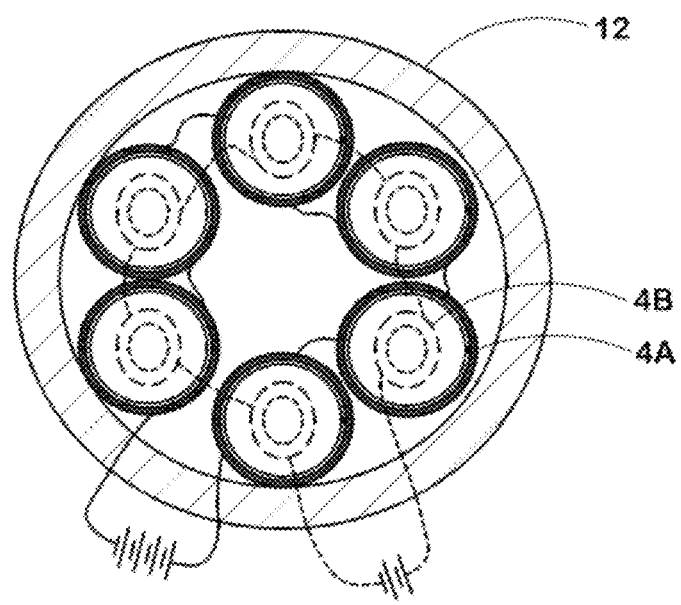
FIG. 8 A cross-sectional view of the catalyst module showing a wired condition of the catalyst structure.

In the system 20, as shown in FIG. 8 for example, a plurality of the catalyst structures 1 are mounted inside the pipe or the widened housing case 12, and the fluid material is flowed into the interior channel thereof.

Each catalyst structure 1 is used as a module capable of self-heating by being connected to an external power supply. Due to such modularization, easy handling is possible.

In the module for hydrogen shown in FIG. 8, six catalyst structures of the first coil 4A and the concentrically inserted second coil 4B are disposed inside the housing case 12 (for example pipe).

The first coils 4A and the second coils 4B are separately connected in series, and controlled so that the temperature of generated heat becomes constant all over.

As to the wire connection in this instance, rather than connecting the coiled wire bodies each other, it is also possible, as shown FIG. 1, to separately apply a specific electric power to each of the coiled wire bodies.

Further, it is possible to arrange such that the temperature of generated heat in the first coils 4A and second coils 4B becomes constant by reducing the electric power on the side of the second coils 4B having a smaller diameter by the use of a resistance having a specific resistance value (not shown) intervening between both of the coils.

Furthermore, the housing case 12 can be utilized as a part of the supply pipe for the fluid to be processed, by forming an inlet port and outlet port for the fluid to be processed, at the front and back of the interior channel in which the first coil 4A and second coil 4B are disposed.

In FIG. 9, another embodiment of the present invention is shown.

The catalyst structure 1 in this embodiment is constructed of the first coil 4A, the second coil 4B inserted therein, and a metallic tube narrow tube 13 as the third catalytic member enveloping the first coil 4A.

And a plurality of the catalyst structures 1 are arranged parallel, and at both of the ends thereof, a first chamber 15 and a second chamber 16 are provided respectively.

The first chamber 15 is substantially tubular. And on the side of one end (in this example, upper side), there is formed a port 15a to which the fluid to be processed is supplied. On the side of the other end of the first chamber 15 (in this example, under side), there is disposed a porous plate 15A provided with an opening 15b which is formed at the position corresponding to the upper end (one end) of the metallic tube narrow tube 13 of each catalyst structure 1.

The second chamber 16 is also substantially tubular. And on the side of one end (in this example, under side), there is formed a port 16a from which the fluid passing through the catalytic reaction is ejected.

On the side of the other end of the second chamber 16 (in this example, upper part), there is disposed a porous plate 16A provided with an opening 16b which is formed at the position corresponding to the other end of the metallic tube narrow tube 13 of each catalyst structure 1.

In this module, for example, the fluid to be processed is sprayed from the port 15a of the first chamber 15 in pulses, and supplied to the catalyst structures 1 through the openings 15b of the porous plate 15A, and then, gathered by the port 16a through the openings 16b of the porous plate 16A of the second chamber 16 after the catalytic reaction in the catalyst structures 1 and ejected to the outside of the system.

In the metallic tube narrow tube 13 as the third catalytic member in the above-mentioned embodiment, the catalytic material X is supported on the inner surface of the metal tube of aluminum for example. Thereby, the catalytic reaction is also possible on the inner surface of the metallic tube narrow tube 13, and the reaction efficiency is improved.

The above-mentioned first and second chambers 15 and 16 are connected with the housing case 12.

The housing case 12 is arranged so as to surround all of the catalyst structures 1, and provided with an outflow port 12b and an inflow port 12a for exhaust gas heated by an engine for example engine and the like.

Thereby, each catalyst structure 1 is heated indirectly by the exhaust heat of the exhaust gas and the like in addition to the electrical heating.

Aside from the coil-shaped product as explained above, the second catalytic member 5 used in the present invention can be modified variously, for example, in the form of a rod, a tube, a sheet such as mesh and woven cloth, and the like.

And any of them is used singularly or parallelly and disposed at the inner or outer surface of the first coiled wire body 4A. In the case that the electric current is passed through each of the first coiled wire body 4A and the second coiled wire body 4B, it is possible to improve the response in the heat generation of each catalytic member.

Further, it is possible that the second catalytic member 5 is formed as a floced aggregation (unwoven web) of a plurality of filaments formed by using a wire which is reduced in the diameter fibrously to 0.1 mm or less and on which a catalyst is supported, and it is disposed on the inside or outside of the first coiled wire body 4A.

Such floced aggregation, which is for example disclosed in Japanese patent NO. 1010424, is small in the mass, therefore it is possible to let it generate heat by the radiation heat from the first coiled catalytic wire body 4A itself.

PRACTICAL EXAMPLES

Hereinafter, more suitable practical examples of the catalyst structure relating to the present invention will be explained. But, the present invention is not limited to such practical examples.

[Manufacture of Aluminum Clad Coiled Wire Body]

As the parent material an aluminum clad wire (wire diameter 12 mm) was manufactured by enveloping a nickel wire (purity 99%) having a capability of electrothermal heat generation with a strip of aluminum (purity 99.9%).

Then, the parent material was repeatedly subjected to wire drawing process and heat treating process at temperature 600 degrees C., and the following two kinds of clad fine wires were prepared.

First clad fine wire: wire diameter 0.45 mm, aluminum layer's average thickness 30 micrometers Second clad fine wire: wire diameter 0.24 mm, aluminum layer's average thickness 20 micrometers In FIG. 3, an enlarged clad state in the cross section of the above-mentioned first clad fine wire is shown.

Then, these clad fine wires were each set to a coiling machine, and it was adjusted so that the ratio (D/d) of the wire diameter d and the average coil diameter D became 8 to 15 times. And, two kinds of tightly-coiled wire bodies each having a length of 120 mm were manufactured.

First coiled wire body: average coil diameter 6 mm second coiled wire body: average coil diameter 4 mm
The coil pitch was adjusted to 1.05 times the above-mentioned wire diameter d for each.
It was confirmed that defectiveness such as separation and the like was not found on the surface aluminum layer, and each coiled wire body was in a good coiled state.

[Alumite Treatment Process for Clad Fine Wire]

Next, each coiled wire body was anodized under conditions: water solution of 4% wt of oxalic acid, temperature of 35 degrees C., and electric current density of 50 to 70 A/sq·m. After that, an acid treatment was made in a state by being dipped into the same kind oxalic acid treatment liquid for six hours, and a pore-size increasing treatment was made and it was dried in the atmosphere.
Next, after a calcination treatment was made at 300 to 450 degrees C. for about one hour, a hydration treatment was made at 80 degrees c or more for about two hours, and it was dried. After that, a further calcination treatment was made at 500 degrees C. for a time corresponding to three hours, and the required alumite clad metal fine wires A, B having a surface layer of a heat-resistant porous alumina having a coating thickness of 10 to 30 micrometers were obtained.
In FIG. 4, shown is a cross section, which was magnified by 500 times, of the alumite clad nickel fine wire having the surface layer of porous alumite of 20 mm thickness.
Further, a closeup picture of the outer surface thereof through a microscope is shown in FIG. 6.

Practical Example 1

Using chloroplatinic acid $H_2PtCl_6 6H_2O$ as a platinum salt becoming the catalytic material, chloroplatinic acid solutions were prepared by dissolving 0.01, 0.015 and 0.02 g of it, respectively, in 10 cc ethanol.
The alumite nickel clad fine wires A, B having the surface layer of porous alumina of 10 to 30 micrometers thickness having coil shapes shown in FIG. 1 were dipped in the above-mentioned solutions, and platinum was supported in the porous structure of the surface.
Thereafter, they were heated up to a specific temperature and dried, and two kinds of supported catalyst wire bodies targeted were obtained. These are referred to as test specimens A and B.
Further, using 5 cc ethanol solution including colloid of platinum of 2 nanometers particle size becoming the catalytic material (4% concentration) for a clad fine wire same as above, a coil shaped alumite nickel clad fine wire c having the surface layer of porous alumina of 30 micrometers thickness was dipped into the above-mentioned solution, and the platinum was supported in the porous structure of the surface thereof. Thereafter, it was heated up to a specific temperature and dried, and a supported catalyst wire body targeted was obtained. This is referred to as test specimen C.

[Test Conditions Etc.]

Figure 10:
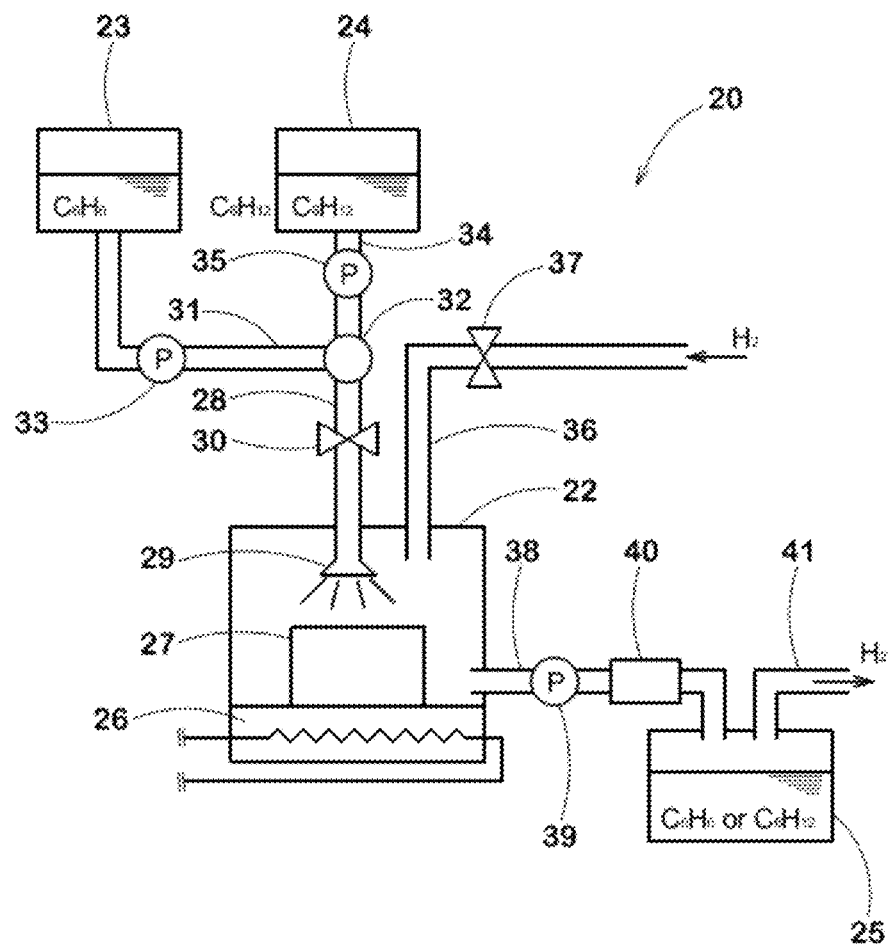
FIG. 10 A schematic view showing a structure of an example of an hydrogen storage-production system utilizing the catalyst which is an alumite clad thin metallic wire on which platinum for hydrogenation/dehydrogenation reaction is supported.

The coiled wire bodies of each test specimen A, B and C were built into the hydrogenation reaction and dehydrogenation reaction apparatus shown in FIG. 10 as the catalyst. And a dehydrogenation reaction of methylcyclohexane was carried out. Then, the hydrogen generation speed and inversion rate of methylcyclohexane to toluene were analyzed and measured with a gas chromatograph.
The test was carried out using each test specimen A-C (catalyst) heated to 310 degrees C., wherein methylcyclohexane was sprayed in nitrogen gas stream from the pulse spray nozzle provided in the reaction apparatus, flow rate 150 ml/min, spray time 0.5 sec. (0.39 gr per one spray), spray interval 10 sec. or 20 sec. Each test specimen A, B, c was electrothermally heated by directly applying an electric power suited for each coiled wire body from a current-voltage stabilizing power supply prepared outside the system.

[Test Results]

In the test results, the methylcyclohexane inversion rates of the platinum support alumite clad fine wire catalysts A, B and C were 53%, 72% and 85%, respectively.
The toluene selectivities were 97%, 98% and 96%, respectively. The average hydrogen production speeds were 0.42 L/minute, 0.57 L/minute and 0.67 L/minute, respectively. From the results, the effectively of the coiled wire bodies of each test specimen A, B and C in the hydrogen production could be confirmed.
The above-mentioned test specimens A and B were concentrically inserted outside and inside.
Using an exclusive fixing component made of glass and placed between the coiled wire bodies in order not to cause eccentricity and coil pitch change by the expansion and contraction during use and by the heat when applying current, the coiled wire bodies were assembled and a set of catalyst structure element was obtained.
Thereby, the arrangement of each coiled wire body is fixed, and it can be expected that local variations of the temperature of generated heat are decreased, and the catalytic activity is stably brought out.
Since these two kinds of the coiled wire bodies were substantially disposed within the space of the first coiled wire body, the density of the above-mentioned catalytic material supported per unit volume was dramatically improved.
By such combination, the efficiency of the above-mentioned hydrogen production was significantly improved.

Practical Example 2

A first clad fine wire (aluminum layer thickness 30 micrometers) having a wire diameter 0.45 mm similar to that used in the above-mentioned Practical example 1 was set to the coiling machine, and
a second coiled wire body of an average coil diameter 4.5 mm and a length 120 mm was prepared.
Then, in order to combine this with the first coiled wire body used in Practical example 1 to make a combined catalyst structure, the alumite treatment and catalyst support were made in the same manner, and
the above-mentioned first coiled wire body and second coiled wire body were respectively dipped in chloroplatinic acid solutions prepared by dissolving 0.02 g of chloroplatinic acid $H_2PtCl_6 6H_2O$ in 10 cc ethanol.
Through the above-mentioned support method in order to pressure infiltrate the platinum catalyst into the porous structure in each surface, the platinum catalyst was supported.
And heating, drying and a reduction treatment on the surface were made, and two kinds of coiled wire bodies having different coil diameters were obtained.
These two kinds of first and second coiled wire bodies have a ratio of the coil diameter (D) to the wire diameter (d) of 13.3 times and 10.0 times, respectively.
By combining concentrically with each other, the area for supporting the catalytic material per unit volume occupied by the first coil catalyst of the larger diameter, that is, the total surface area was increased by about 40% or more.
A thermal test was made in order to confirm the efficiency of heat generation accompanying the heating of each of the coil catalysts when these are combined and used, the coil shape, and whether surface defects were present.

In the test, the second coil catalyst was mounted within the space of the above-mentioned first coil catalyst, and they were connected in series and constructed to be gradually heated by applying a current from an external power supply prepared outside the system.

The test was made for a total of ten hours, while repeating a heatup toward the target of 360 degrees c and a cooldown by turning off the electricity at intervals of one minute.

Each coil catalyst was checked whether defects in the surface of the alumite layer and change in the coil shape due to the heatup and cooldown were present.

As a result, serious defects were not found in each coiled wire body.

Since the plural members were arranges closely to each other, owing to the radiation heat from one member to the other, the electrical efficiency was improved to make a contribution to the saving of electricity.

Practical Example 3

Using an aluminum clad fine wire of a wire diameter of 0.45 mm similar to the catalytic wire in Practical example 1, a first coiled catalytic wire body of an average coil diameter of 8 mm and a length of 120 mm was prepared.

As the second catalytic member in the internal space thereof, a twisted wire body of a length of 120 mm was formed by twisting seven fine wires of an outer diameter of 0.8 mm on which the catalyst was supported in the same manner.

In the space between these members, there was assembled an unwoven web (third catalytic member) having a density of 2% and made of 20 micrometer diameter fibers formed from a core wire of a copper metal on which the catalyst was supported in the same manner, and a combined catalyst element module was made.

Then, in the hydrogen process, the first and third catalytic members are each applied by an electric current to be electrothermally heated, and a condition to make an overall heating temperature to be 350 degrees C. was set.

Since the unwoven web as the third catalytic member was made of the copper metal excellent in the electrothermal heating, it was thermally influenced by the first and third catalytic members disposed on both sides thereof, and it could be easily heated up to a relatively-near temperature without the need of applying an electric current. Thereby, in gross, the efficiency of supporting the catalytic material in a specific volume could be further improved. Further, by the interposition of the unwoven web, the holding of the inwardly-disposed third catalyst wire body could be stabilized. Furthermore, the resistance to flow-down of the cyclohexane liquid used as the processed fluid was not affected. Thus, it was a very preferable one.

In this construction, the intermediate unwoven web was very fine, and the surface area could be greatly increased. Further, the unwoven web secured a thermal absorptivity and a good positional relationship of the first coiled wire body and the second catalytic member disposed on both sides thereof. Furthermore, it had an advantage capable of reducing the resistance to the flow of the supplied fluid to be processed. Thus, it was a preferable one.

Practical Example 4

A combined catalyst element was made, wherein the outside of a catalyst structure concentrically having
the first coiled wire body A in which an aluminum clad wire of an outer diameter of 0.5 mm constructed in the same manner as the catalytic wire in Practical example 1 was set to the coiling machine, and shaped by tightly coiling it with an average coil diameter of 8 mm, a pitch of 1.1 d, and a length of 120 mm, and the catalyst was supported thereon, and
the second coiled wire body which was similarly coiled in the opposite direction with an average coil diameter of 4.5 mm, a pitch of 1.1 d, and a length of 120 mm and in which the catalyst was supported similarly (but, formed through the catalyst adding method which was test specimen C)
was surrounded by
a circular cylinder of aluminum as the third catalytic member having a length of 120 mm, an outer diameter of 12 mm, an inner diameter of 10 mm, and provided on the inner surface and the outer surface with a surface layer of porous alumina having a thickness of 30 micrometers.

Then, fifty of it were assembled into an apparatus as shown in FIG. 9, and the methylcyclohexane dehydrogenation reaction apparatus was prepared.

And a dehydrogenation reaction of methylcyclohexane was made. In this construction, as the above-mentioned first coiled wire body and the second coiled wire body were coiled in the opposite directions, entanglement was not occurred therebetween.

In the test, methylcyclohexane was supplied to each catalyst structure element heated up to the predetermined temperature of 350 degrees C. from four pulse spray nozzles of the reaction apparatus in nitrogen gas stream, flow rate 200 ml/min, spray time 1 sec., amount of each spray 5.8 g per one spray nozzle, and spray interval 10 sec.

And the hydrogen generation speed and the inversion rate of the methylcyclohexane to toluene were analyzed and measured with a gas chromatograph.

The platinum support alumite clad fine wire catalyst was heated by directly applying an electric power suitable for each coiled wire body from a current-voltage stabilizing power supply prepared outside the system.

The outer surface of the cylindrical catalyst was set at 280 degrees C. by circulating the high temperature exhaust gas in the inside of the housing.

As a result, as to the hydrogen supply performance of the dehydrogenation reactor in which fifty catalyst structure elements were incorporated, the effectivity of producing hydrogen at the methylcyclohexane inversion rate of 85%, and the average hydrogen production speed of 150 L/minute in term of toluene selectivity was confirmed.

INDUSTRIAL APPLICABILITY

The present invention can be widely applied to chemical industries and automobile, ship and locomotive industries utilizing hydrogen as fuel.

The invention claimed is:
1. A catalyst structure for a hydrogenation reaction or dehydrogenation reaction comprising:
a first coil of a first catalytic wire, and
a second coil of a second catalytic wire, the second coil having a coil diameter different than that of the first coil, and arranged concentrically with the first coil so that one of the first and second coils is disposed inside the other, wherein
each of the first and second catalytic wires is composed of
a core wire made of a nickel material comprising not less than 99 wt % of Ni,
an aluminum layer covering the surface of the core wire and made of aluminum,
a surface layer covering the surface of the aluminum layer and made of anodized aluminum having a microscopical porous structure, and
a catalytic material for hydrogenation reaction or dehydrogenation reaction supported on the surface of the surface layer, and
the total volume of the aluminum layer and the surface layer made of anodized aluminum is in a range of from 2 to 40% of the entire volume of the catalytic wire.

2. The catalyst structure as set forth in claim 1, wherein an equivalent diameter (d) of each of the first and second the catalytic wire is not more than 0.8 mm.

3. The catalyst structure as set forth in claim 2, wherein at least one of the first and second coils has an average coil diameter (D) of 3 to 20 times the equivalent diameter (d) of the catalytic wire thereof.

4. The catalyst structure as set forth in claim 2, wherein at least one of the first and second coils is formed with a coil pitch (P) of 1.01 to 1.50 times the equivalent diameter (d) of the catalytic wire thereof.

5. The catalyst structure as set forth in claim 1, wherein the coiling directions of the first and second coils are opposite to each other.

6. The catalyst structure as set forth in claim 1, wherein the above-mentioned surface layer made of anodized aluminum having the microscopical porous structure is provided with bottomed fine pores having a U-shaped cross section.

7. The catalyst structure as set forth in claim 1, wherein the first catalytic wire bogy and the second catalytic wire are constructed so that both ends thereof are connected to an electrical power supply.

8. A system comprising the catalyst structure as set forth in claim 1 and a connected electrical power supply for supplying electric power to the first catalytic wire and/or the second catalytic wire.

9. A set of a plurality of the catalyst structures as set forth in claim 1, wherein the first coils are electrically series-connected, and the second coils are electrically series-connected separately from the first coils.

10. A system comprising a plurality of the catalyst structures as set forth in claim 1, wherein
the first coils are electrically series-connected, and
the second coils are electrically series-connected separately from the first coils, and
the system further includes electrical power supplies for supplying electric power to the first coil and the second coil, respectively.

11. A catalyst structure for hydrogenation reaction or dehydrogenation reaction comprising:
a first coiled catalytic wire and
a second catalytic member disposed on the inside or outside of the coiled catalytic wire body, wherein
the first coiled catalytic wire is composed of
a core wire made of a nickel material comprising not less than 99 wt % of Ni,
an aluminum layer covering the surface of the core wire and made of aluminum,
a surface layer covering the surface of the aluminum layer and made of anodized aluminum having a microscopical porous structure, and
a catalytic material for hydrogenation reaction or dehydrogenation reaction supported on the surface of the surface layer, and
the total volume of the aluminum layer and the surface layer made of anodized aluminum is from 2 to 40% of the entire volume of the catalytic wire, and
the second catalytic member is a tubular body in which a catalytic material for hydrogenation reaction or dehydrogenation is supported on the inner surface or outer surface thereof.

12. The catalyst structure as set forth in claim 11, wherein the tubular body includes
a core made of a metallic material, and
an anodized aluminum layer of a porous structure formed on the surface layer of the core material, and
the catalytic material is fixed to the anodized aluminum layer.

13. The catalyst structure as set forth in claim 12, wherein the metallic material of the core of the tubular body exhibits electrical resistivity at ordinary temperatures of not less than 5 μΩ·cm, and is a metallic material selected from the group consisting of stainless steel, nickel, nickel alloys, chromium, chromium alloys, titanium, titanium alloys, aluminum, aluminum alloys, tungsten and tungsten alloys.

14. The catalyst structure as set forth in claim 11, wherein an equivalent diameter (d) of the first coiled catalytic wire is not more than 0.8 mm.

15. A module for a hydrogenation reaction comprising: a catalyst structure comprising, a first coiled catalytic wire and a second catalytic member disposed on the inside or outside of the first coiled catalytic wire, wherein the first coiled catalytic wires is composed of a core wire made of a nickel material comprising not less than 99 wt % of Ni, an aluminum layer covering the surface of the core wire and made of aluminum, a surface lager covering the surface of the aluminum layer and made of anodized aluminum having a microscopical porous structure, and a catalytic material for hydrogenation reaction supported on the surface of the surface layer, and the total volume of the aluminum layer and the surface layer made of anodized aluminum is from 2 to 40% of the entire volume of the catalytic wire, and a housing case is provided therein with an interior channel which connects one opening to another opening of the housing and through which a fluid to be processed flows, and the catalyst structure is disposed in the interior channel such that the axis line of the first coiled catalytic wire is oriented in the flow direction of the fluid to be processed.

16. The module as set forth in claim 15, wherein
said housing case is provided therein with a plurality of tube members each forming said interior channel, and
the catalyst structure is disposed in each of the tube members.

17. The module as set forth in claim 15, wherein
an equivalent diameter (d) of the first coiled catalytic wire is not more than 0.8 mm.

* * * * *